Patented Dec. 4, 1951

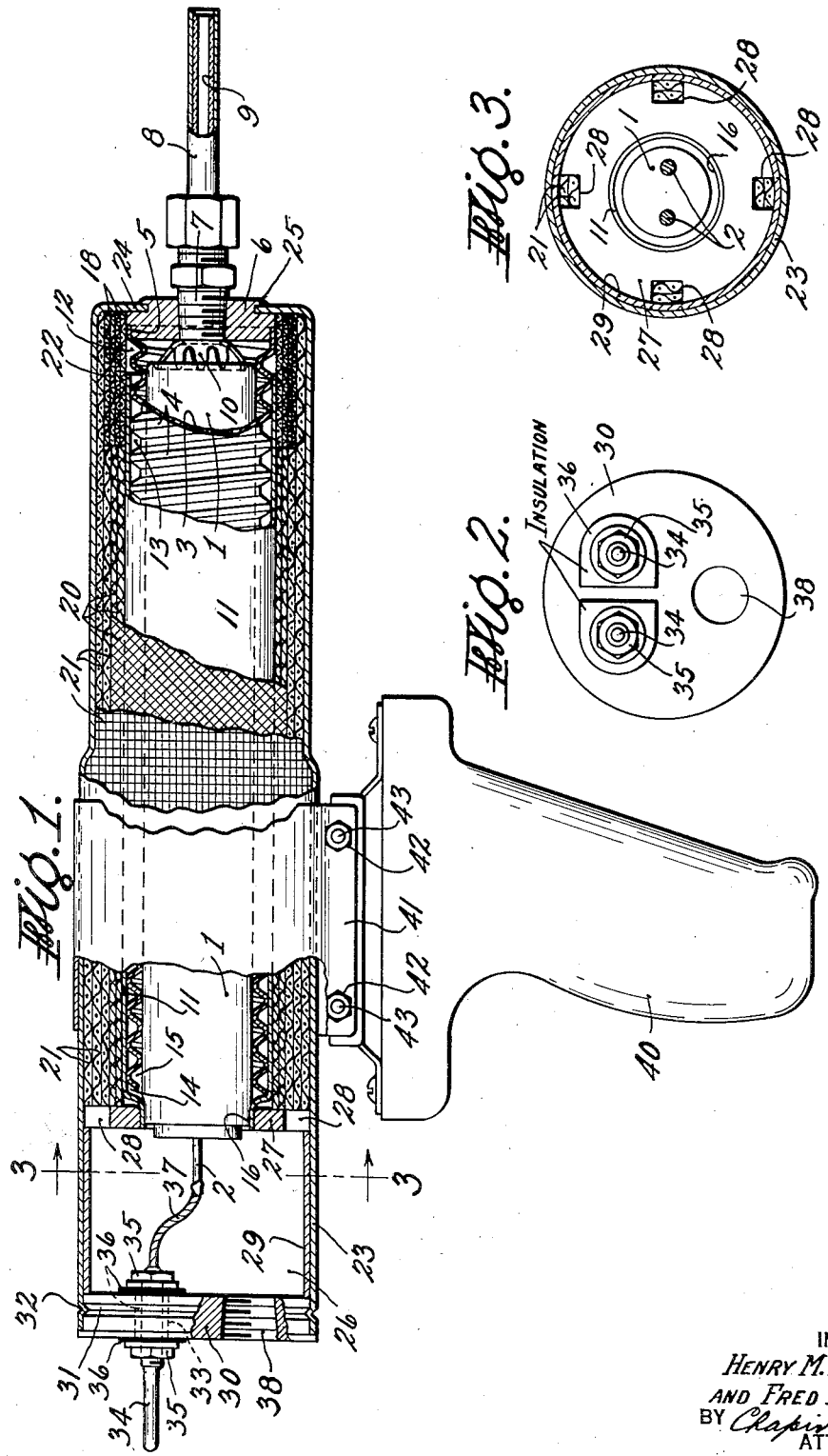

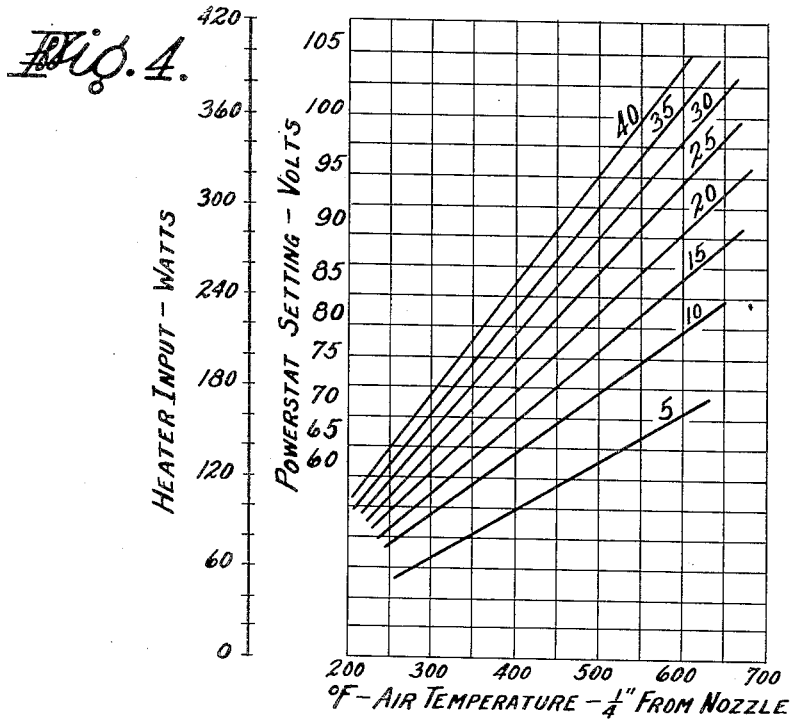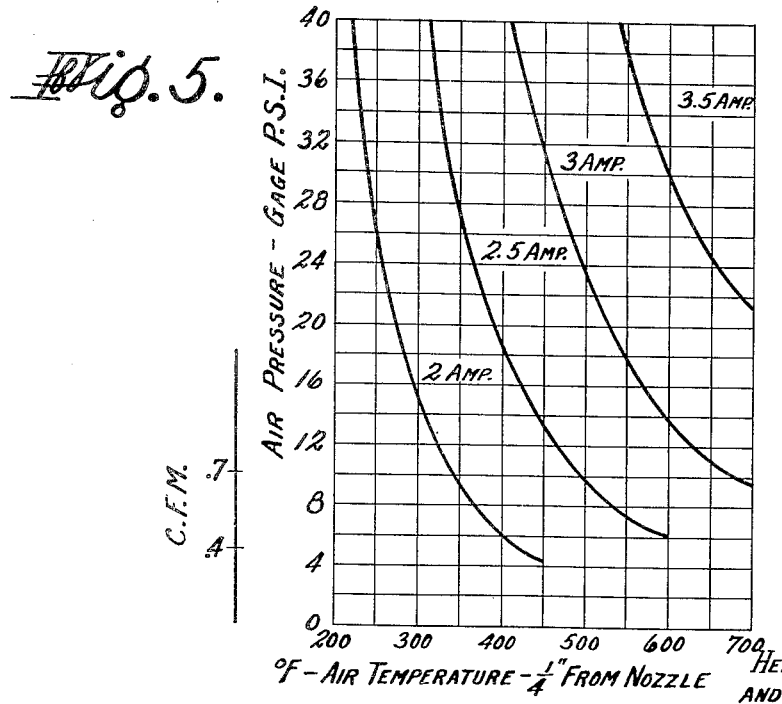

2,577,269

UNITED STATES PATENT OFFICE 2,577,269

FLAMELESS HOT GAS TORCH

Henry M. Richardson, Springfield, and Fred E. Wiley, Leominster, Mass., assignors to De Bell & Richardson, Inc., Hazardville, Conn., a corporation of Massachusetts Application November 16, 1949, Serial No. 127,584

9 Claims. (Cl. 219—39)

This invention relates to an improved flameless gas torch for use in the softening, shaping and welding of plastic materials, and having further utilities in the removal of paint and similar coatings from wood and other surfaces.

There is a considerable range of materials which are thermo-plastic and weldable and which are formable into sheets, tubes and rods, and from which forms all manner of articles can be fabricated by softening, shaping or welding. Among these materials may be mentioned polyethylene, polyvinyl chloride, polyisobutylenes, copolymer resins such as styrene isobutylene, styrene butadiene, styrene isoprene, and styrene acrylonitrile, where styrene is the major component, usually in the range 60 to 90%, and copolymers of vinyl chloride with vinyl acetate, vinylidene chloride, acrylic or methacrylic esters, or of vinylidene chloride with small amounts of vinyl chloride or acrylonitrile.

The chemical stability and mechanical strength and toughness of many of these materials make them desirable for use in the construction of numerous articles and devices, particularly corrosion resistant chemical apparatus and parts thereof.

For the fabrication of such articles, it is desirable to have a hot gas torch so that welded seams can be made in the fabrication of such articles, and rods and other forms can be bent or otherwise formed to desired shape. It is impractical to use an ordinary gas flame torch, because the temperature of the flame is far too high to be withstood by these thermoplastic materials and the continued application of such high temperature tends to cause decomposition, oxidation or burning of the material. On the other hand, if a blast of heated air or inert gas is directed on the plastic to be shaped or welded and on the filler rod to be used in welding a seam, and if the temperature of this hot gas is substantially above the softening point of the material but below its decomposition point, satisfactory shaping can be accomplished and clean, strong welds can be made. A close temperature control is important.

Various attempts have been made to provide hot gas torches for use in the welding and shaping of these plastic materials. Difficulty has been encountered however in constructing torches for this purpose due to their relatively low efficiency and the fact that constant adjustment has been necessary to maintain the desired temperatures.

It is one purpose of this invention to provide a flameless, heated gas torch which uses a standard cartridge type electric heater element as a source of heat and to provide an efficient compact heat exchange system for rapidly heating the air or inert gas to a predetermined temperature without overheating the cartridge and without excessive radiation losses.

A further object is to provide a heat exchange system which is sufficiently stable so that by applying a given current to the cartridge heater and a given pressure to the gas a constant flow of gas at a substantially constant predetermined temperature will be delivered from the nozzle. In other words, for a given setting of the current through the cartridge heater and the application of given air pressure a given temperature will be reached and maintained at the welding area.

In the accompanying drawing, which illustrates an embodiment of the invention:

Fig. 1 is a side elevational view of a torch embodying our invention, parts being broken away and the relative thickness of certain of the elements being exaggerated for the sake of clearness;

Fig. 2 is a rear elevational detail view of the torch cylinder;

Fig. 3 is a sectional view substantially on line 3—3 of Fig. 1; and

Figs. 4 and 5 are graphs showing the heat exchange characteristics of the device.

Referring to the drawings, the device is shown as comprising a conventional type of cartridge heater 1 which is provided with the usual electric conductor prongs 2. (The General Electric Company's heater 187–H having a rating of 450 w. on a 115 v. line is satisfactory for our purposes.) The cartridge 1 is tightly telescoped within a metal cylinder 3 which is provided with helical corrugations 4. The forward end of the cylinder 3 extends slightly beyond the forward end of the cartridge and the end of the cylinder is tightly press-fitted over a shoulder 5 formed in an end plug 6. Plug 6 is provided with a central opening 7 which is threaded to receive a discharged nozzle, shown in the form of a stainless steel tube 8 which is preferably glass lined as indicated at 9 to minimize heat conduction. The forward end of the cartridge 1 is held in spaced relation to the plug 6 by a pronged washer 10, the central opening of the washer being aligned with the opening 7. A smooth metal cylindrical sleeve 11 is tightly telescoped over the corrugations 4 of corrugated cylinder 3. The forward end of the sleeve 11 stops short of the forward end of the corrugated cylinder to provide an opening 12 to an outer rearwardly extending passage or channel 13 formed between the corrugations 4 and sleeve 11. The rear end of the sleeve 11 is carried beyond the rear end of cylinder 3 to provide a passage 14 from the outer channels 13, to a forwardly extending passage or channel 15 formed between the inner face of said corrugations and the cartridge heater 1. The rear end of sleeve 11 is spun down tightly against the end of the cartridge 1 as indicated at 16.

The assembly described is covered by a wrapping in the form of a reticulate mass of wire which may be in the form of a batt of metal wool or wire but which preferably, and as shown, is formed of windings of metal cloth or screening. Preferably also the wire mass is more closely packed at the forward end to provide finer or smaller interstices. In the preferred structure a strip of fine mesh metal screening 18, preferably bronze or stainless steel, is wound around the forward end portion of cylinder 3 and the adjacent end of plug 6, and the forward portion of sleeve 11, the convolutions of the screen 18 overlying and bridging the passage 12. Rearwardly of the fine screen windings 18 the sleeve 11 is wrapped with a plurality of convolutions of woven glass fabric 20. Over the fabric 20 is wrapped a plurality of convolutions of relatively coarse metal screening 21. One or more of the outer convolutions of the coarse screen 21 extend over the convolutions of the fine screen as indicated at 22. The convolutions of the coarse and fine screen may be held in place in any suitable manner as by a binding of fine wire, not shown.

The assembly above described is tightly telescoped within an outer metal casing 23, preferably of aluminum, and the forward end of the casing 23 is spun over the forward end of the plug 6 as at 24. The outer face of plug 6 is provided with a relatively thin flange which is spun radially outwardly over the inwardly turned end of casing 23 as indicated at 25 to provide a tight seal at the forward end of the structure.

The rear end of casing 23 extends substantially beyond the end of cartridge 1 and its encircling members to provide a chamber 26. An annular member 27 is press fitted over the downwardly spun end 16 of the cylinder 11. Member 27 fits tightly within the casing and is provided with a plurality of peripheral notches 28 which open from the chamber 26 to the edges of the convolutions of the coarse screen 21. A cylindrical spacer 29 is fitted within the rear end portion of the casing 23 and the end of the casing is closed by a plug 30, the plug being provided with a groove 31 into which the material of the casing is spun as at 32 to provide a tight joint. The plug 30 is provided with openings 33 to receive electric prongs 34 held in place by suitable nuts 35, the prongs being insulated from the plug 30 in a conventional manner, as indicated at 36. The inner ends of the prongs 34 are connected to the prongs 2 of the electric cartridge by conductors 37 brazed or otherwise suitably secured to the prongs. The plug 30 is also formed with a threaded opening 38 for connection to a source of air, or suitable inert gas, delivered under controlled pressure.

The torch is provided with a suitable handle 40 secured to the torch in any suitable manner as by a band 41 clamped around the torch by nuts and bolts 42 and 43 respectively.

In operation, the prongs 34 are connected to a source of electric current through lines provided with suitable means for controlling the current, not shown, and gas under controlled pressure is supplied to the chamber 26 through the opening 38. From the chamber 26 the gas passes along and through the interstices between the reticulated wire mass formed by the coarse screen windings 21 to the forward end of the casing and then downwardly through the fine screen windings and through the passage 12 to the outer passage or channel 13 of cylinder 3. It then passes along the helical channel 13 to the rear end of the cylinder 3, through passage 14 to the inner helical channel 15 and thence in direct contact with the heating cartridge 1 to the forward end of the casing whence it passes through the spaces between the prongs of the washer 10 and outwardly through the nozzle 8. The heat conducted from the high temperature gas passing to and through the nozzle and conducted along the casing is partially absorbed by the screening 18 and 21 which substantially fills the annular passage between sleeve 11 and casing 23 and is transferred to the entering gas passing forwardly through the screen mass. As the gas passes rearwardly through the channel 13 between the cylinder 3 and sleeve 11 it is further heated from the heated walls of the cylinder 3 and sleeve 11 which obtain heat by direct metallic conduction from heater 1 as well as by heat transfer from the hot gas in channel 15. The windings of the glass fabric 20 tend to suppress radiation and conduction from the casing 11.

The metal packed passages and formation of the open channels, in combination with the velocity of the gas, produces a turbulent flow, which flow is counter to the temperature gradient, factors which increase the efficiency of the heat exchange.

Calculations of the efficiency of a torch constructed as above described show that between 60 and 70 percent of the heat input is transferred to the hot gas leaving the nozzle 8. The balance is the radiation loss from the outer shell of the torch which is found to be in equilibrium at temperatures ranging from about 50° C. at the rear end to 200° C. at the nozzle end.

The stability of the heat exchange structure above described is shown in the graphs of Figs. 4 and 5. In Fig. 4, where the energy input in watts is plotted against the temperature of the hot gas discharge measured at a distance of one-fourth of an inch from the end of the discharge nozzle at air pressures of 5 to 40 pounds per square inch. It is there seen that for a given constant air pressure the temperature rises in straight lineal relation to the increase in the energy input. In Fig. 5 where the air pressure in pounds per square inch is plotted against the temperature of the hot gas discharge at a distance of one-fourth of an inch from the end of the discharge nozzle it is seen that, for given constant electrical inputs, the temperature rises in a smooth curvilineal relation to the fall in air pressure. In view of the stability of the operational heat exchanges a given desired working temperature may be obtained by initial adjustment of either the current input or the gas pressure or both and the device will maintain such temperature within extremely close limits. As far as we are aware no previously available structure provides the stability in operation equivalent to or approximating that of our invention.

While the torch of the present invention has particular advantages in the shaping and welding of plastic materials, the stability and control which it affords make it useful, as previously mentioned, in various other operations such as the removal of paint and similar coatings from wood and other surfaces. In these latter uses the absence of any flame is of distinct advantage in reducing or eliminating the fire hazard usually present in such operations.

What we claim is:

1. A flameless torch which comprises a heat exchanger consisting of an annular passage packed throughout its length with a reticulate mass of metallic material, a helical passage and an electrical heater arranged in series, said reticulate mass being in heat exchanging relation with the foremost portion at least of the adjacent helical passage, and means to introduce gas to said annular passage under pressure for turbulent flow through said passages and around said heater counter current to the heat gradient.

2. A flameless torch which comprises a cylindrical casing, a cylindrical electrical cartridge-type heater of less diameter than the casing positioned in the casing coaxially therewith, partition members dividing the space between the heater and the casing into a forwardly extending annular passage and a rearwardly and a forwardly extending helical passage positioned between the annular passage and the heater, said several passages being connected in series, said annular passage being substantially filled with a reticulate mass of wire, said reticulate mass being in heat exchanging relation with the foremost portion at least of the adjacent helical passage and bridging the entrance to said adjacent passage, an opening at the rear of the casing for admitting gas under pressure to said annular passage, a discharge opening at the forward end of the casing with which the forward end of the last-mentioned passage communicates, and electrical terminals extending through the casing and connected to said heater for supplying current to the heater.

3. A flameless torch which comprises a cylindrical casing, a cylindrical electrical cartridge-type heater of less diameter than the casing positioned in the casing coaxially therewith, partition members dividing the space between the heater and the casing into a forwardly extending annular passage and a rearwardly and a forwardly extending passage positioned between the annular passage and the heater, said several passages being connected in series, said annular passage being substantially filled with a reticulate mass of wire, having finer interstices at the forward end of the passage than at the rear, an opening in the casing for admitting gas under pressure to said annular passage, a discharge opening at the forward end of the casing with which the forward end of the last-mentioned passage communicates, an insulation lined discharge nozzle fitted in the discharge opening, and electrical terminals extending through the casing and connected to said heater for supplying current to the heater.

4. A flameless torch which comprises a cylindrical casing, a cylindrical electrical cartridge-type heater of less diameter than the casing positioned in the casing coaxially therewith, a helically corrugated cylinder telescoped on said heater and a sleeve telescoped on said cylinder dividing the space between the heater and the casing into a forwardly extending annular passage and a rearwardly and a forwardly extending passage positioned between the annular passage and the heater, said several passages being connected in series, said annular passage being substantially filled with a reticulate mass of wire comprising a plurality of windings of metal screening, an opening in the casing for admitting gas under pressure to said annular passage, a discharge opening at the forward end of the casing with which the forward end of the last-mentioned passage communicates, and electrical terminals extending through the casing and connected to said heater for supplying current to the heater.

5. A flameless torch which comprises a cylindrical casing, a cylindrical electrical cartridge-type heater of less diameter than the casing positioned in the casing coaxially therewith, a cylindrical sleeve dividing the space between the heater and the casing into a forwardly extending annular passage between the sleeve and casing, partition members between the sleeve and heater forming rearwardly and forwardly extending helical passages, said several passages being connected in series, said annular passage being substantially filled with a plurality of windings of metal screening, the screening being of finer mesh adjacent the forward end of the passage, an opening in the casing for admitting gas under pressure to said annular passage, a discharge opening at the forward end of the casing with which the forward end of said forwardly extending helical passage communicates, and electrical terminals extending through the casing and connected to said heater for supplying current to the heater.

6. A flameless torch which comprises a cylindrical casing, a cylindrical electrical cartridge-type heater of less diameter than the casing positioned in the casing coaxially therewith, partition members comprising a helically corrugated cylinder telescoped over said heater and a cylindrical sleeve telescoped over said corrugated cylinder and dividing the space between the heater and the casing into a forwardly extending annular passage between the casing and sleeve, a rearwardly extending helical passage between the corrugated cylinder and the sleeve and a forwardly extending helical passage between the corrugated cylinder and the heater, said several passages being connected in series, a layer of heat insulating material surrounding the rear portion of the sleeve, said annular passage being substantially filled with a plurality of windings of metal screening, an opening in the casing for admitting gas under pressure to said annular passage, a discharge opening at the forward end of the casing with which the forward end of the last-mentioned passage communicates, and electrical terminals extending through the casing and connected to said heater for supplying current to the heater.

7. A flameless torch which comprises a cylindrical outer casing having closure members at each end, a partition member adjacent the rear end of the casing and dividing the latter into a rear gas receiving chamber and a forward heat exchange chamber, a cylindrical electrical cartridge-type heater unit of less diameter than the casing, positioned in the forward chamber coaxially with the casing, the end of the unit being spaced from the forward end closure of the casing, a helically corrugated cylindrical member telescoped over the heater unit, the forward end of said corrugated member being connected to the forward end closure of the casing to form a gas discharge chamber, a cylindrical sleeve telescoped over the corrugated member and connected at its rear end with said partition member and forming with the casing a forwardly extending annular passage, said sleeve stopping short of said forward closure member to provide an opening from said annular passage to a rearwardly extending helical passage formed between said sleeve and the outer corrugations of the corrugated member, said rearwardly extending helical passage communicating at its rear end with the rear end of a forwardly extending helical passage formed between the inner corrugations of the corrugated member and the heater and opening to said gas discharge chamber, a plurality of windings of glass fabric around the rear portion of said sleeve, a plurality of windings of fine mesh metal screening about the forward portion of said sleeve, and a plurality of windings of coarser mesh metal screening about the glass fabric windings at the rear portion of the sleeve, said windings filling said annular passage, a gas supply opening through the casing to said gas supply chamber, openings from the latter through said partition member to said annular passage, an opening through said forward closure member from the gas discharge chamber, a glass lined discharge nozzle in said last-named opening, and electrical conductors extending from the rear end of the heater unit through said gas supply chamber and connected to outwardly extending plug in terminals carried by the rear closure member.

8. A flameless torch which comprises a heat exchanger consisting of an annular passage packed throughout its length with a reticulate mass of metallic material, said packing at the outlet end of the passage providing a greater heat transfer than at the inlet end of the passage, a helical passage and an electrical heater arranged in series, said reticulate mass being in heat exchanging relation with the foremost portion at least of the adjacent helical passage, and means to introduce gas to said annular passage under pressure for turbulent flow through said passages and around said heater counter current to the heat gradient.

9. A flameless torch which comprises a cylindrical casing, a cylindrical electrical cartridge-type heater of less diameter than the casing positioned in the casing coaxially therewith, a helically corrugated cylinder telescoped on said heater and a sleeve telescoped on said cylinder dividing the space between the heater and the casing into a forwardly extending annular passage and rearwardly and forwardly extending helical passages positioned between the annular passage and the heater in interspaced relation, said several passages being connected in series, an opening at the rear of the casing for admitting gas under pressure to said annular passage, a discharge opening at the forward end of the casing with which the forward end of the last-mentioned passage communicates, and electrical terminals extending through the casing and connected to said heater for supplying current to the heater.

HENRY M. RICHARDSON.
FRED E. WILEY.

REFERENCES CITED

The following references are of record in the file of this patent:

UNITED STATES PATENTS

| Number | Name | Date |
|---|---|---|
| 1,439,340 | St. Clair | Dec. 19, 1922 |
| 2,010,331 | Starrick | Aug. 6, 1935 |
| 2,028,095 | Tully et al. | Jan. 14, 1936 |
| 2,372,737 | Phillips, Jr. | Apr. 3, 1945 |